| United States Patent [19] | [11] Patent Number: 4,585,579 |
| Bommaraju et al. | [45] Date of Patent: Apr. 29, 1986 |

[54] SUPPRESSION OF CORROSION IN CAUSTIC MANUFACTURING SYSTEMS

[75] Inventors: Tilak V. Bommaraju, Grand Island; William V. Hauck, North Tonawanda; Vernon J. Lloyd, Lewiston, all of N.Y.

[73] Assignee: Occidental Chemical Corporation, Niagara Falls, N.Y.

[21] Appl. No.: 656,194

[22] Filed: Oct. 1, 1984

[51] Int. Cl.$^4$ .............................................. C23F 11/06
[52] U.S. Cl. ..................................... 252/387; 422/13; 210/757; 423/183; 423/641; 159/DIG. 20; 159/DIG. 34
[58] Field of Search ............... 423/183, 641, 179; 252/387; 422/13; 210/757; 159/DIG. 20, DIG. 34

[56] References Cited

U.S. PATENT DOCUMENTS

| | | | |
|---|---|---|---|
| 2,404,453 | 7/1946 | Osborne et al. | 204/153 |
| 2,735,750 | 2/1956 | Rahn | 252/387 X |
| 3,600,316 | 8/1971 | Mostecky et al. | 423/641 X |
| 4,282,178 | 8/1981 | Khare | 423/269 X |
| 4,397,720 | 8/1983 | Moore et al. | 210/757 X |

FOREIGN PATENT DOCUMENTS 1523979  9/1978  United Kingdom ................ 423/641

OTHER PUBLICATIONS

Hawley, G. G. (Ed.), *The Condensed Chemical Dictionary*, Ninth, Ed. 1977, Van Nostrand Reinhold Co., p. 448.

*Primary Examiner*—John F. Terapane
*Assistant Examiner*—Matthew A. Thexton
*Attorney, Agent, or Firm*—James F. Tao; William G. Gosz

[57] ABSTRACT

The addition of a small amount of hydrogen or a hydrogen-liberating compound such as a metal hydride to a caustic solution serves to suppress the corrosive effect of the solution on nickel-based surfaces. Typical nickel-based surfaces include caustic evaporator surfaces which contain a caustic solution maintained at a temperature of from about 130° C. to about 180° C. A preferred metal hydride is sodium borohydride which is preferably present in an amount of from about 5 ppm to about 100 ppm. Concentrated caustic solutions containing less than 0.5 ppm of nickel can be prepared by this process.

14 Claims, No Drawings

SUPPRESSION OF CORROSION IN CAUSTIC MANUFACTURING SYSTEMS

BACKGROUND OF THE INVENTION

The present invention relates to caustic solutions having reduced corrosive effect on nickel-based surfaces. In particular, this reduction in corrosion is due to the addition of a small amount of hydrogen or a metal hydride to the caustic solution. The hydrogen or metal hydride is added during the process for manufacturing caustic soda, and preferably during the concentration of the caustic solution by evaporation of water from the solution.

Caustic soda (NaOH) is commercially manufactured by the electrolysis of brine in chlor-alkali diaphragm or membrane cells followed by the concentration of the catholyte cell liquor to evaporate water and to precipitate sodium chloride from the solution. The evaporation process typically employs a multiple stage evaporator fabricated from nickel, nickel alloys or materials such as E-Brite. Such evaporators operate at elevated temperatures of from about 100° C. to about 200° C. A considerable amount of fluid turbulence is also present in the evaporator system. Under these conditions, the observed corrosion rate of nickel or nickel alloy evaporator surfaces can exceed 0.2 g/m² hr. In addition, ancillary nickel or nickel alloy piping and components which are exposed to such caustic solutions also undergo a substantial amount of corrosion and/or erosion.

Corrosion in caustic manufacturing systems represents a significant commercial problem since it can reduce the effective life of system components and, in addition, results in a sodium hydroxide product having significant amounts of dissolved nickel, i.e. 2 ppm or more. This is undesirable since bleaching chemicals prepared from caustic soda containing high concentrations of dissolved nickel are discolored in appearance and are chemically unstable.

Prior art attempts to solve the corrosion problem have primarily focused on the necessity for eliminating or reducing the amount of sodium chlorate in the system. Sodium chlorate is present in diaphragm cell liquor as an impurity in concentrations generally less than about 1%. Sodium chlorate is a strong oxidizing agent, and even amounts as little as 0.02% can cause significant corrosion problems for nickel-based materials. Sodium sulfite has been widely used for sodium chlorate removal. The use of sodium sulfite for this purpose, however, is associated with several disadvantages such as its cost, the necessity for significant capital additions to the plant, and product contamination.

The use of hydrogen to reduce the chlorate content of chlorate-containing solutions is disclosed in Netherlands patent application No. 7603314, published Oct. 4, 1977, wherein hydrogen is reacted with the solution under high temperature and pressure conditions in the presence of a carbon-supported ruthenium catalyst to produce sodium chloride and water as illustrated by the following reaction:

$$NaClO_3 + 3H_2 \xrightarrow{Ru/C} NaCl + 3H_2O \quad (1)$$

This process is also disadvantageous since it requires approximately stoichiometric amounts of hydrogen, and utilizes elevated temperature and pressure conditions and expensive catalytic materials.

U.S. Pat. No. 4,282,178 discloses the use of hydrazine in relatively small quantities, i.e. less than 40 ppm, to inhibit corrosion of nickel-containing metal surfaces during caustic evaporation at elevated temperatures. Although the hydrazine is indeed effective at reducing the corrosion rate of nickel-containing surfaces and in improving the purity of the concentrated caustic soda product, the use of hydrazine in such systems is associated with several disadvantages. For instance, hydrazine is extremely explosive and must be handled with great care. This requirement necessitates the installation of expensive equipment which must be used to handle hydrazine, and requires the use of numerous safety precautions in the plant. The instability of hydrazine places severe limitations on its use in the cell room prior to evaporation and further limits its safe use in the final product.

It is therefore a principal object of the present invention to provide an efficient, safe and relatively inexpensive method for suppressing corrosion of nickel-based materials used in caustic manufacturing systems.

SUMMARY OF THE INVENTION

In accordance with one embodiment of the present invention, an aqueous caustic solution comprises from about 10% to about 80% by weight of sodium hydroxide, sodium chlorate as an impurity, and from about 0.1 ppm to about 500 ppm of a metal hydride as a corrosion inhibitor or suppressant. Preferably, the sodium hydroxide is present in an amount of from about 40% to about 80% by weight, and the metal hydride is sodium borohydride present in an amount of from about 5 ppm to about 100 ppm. The sodium chlorate concentration is preferably less than about 1% by weight and is typically more than about 0.02% by weight.

In a further embodiment, this invention is directed to an improved process for suppressing the corrosion of nickel-based components which contact aqueous caustic solutions in the manufacture of caustic soda which comprises adding from about 0.1 ppm to about 500 ppm of a metal hydride or hydrogen to the caustic solution during the manufacturing process. Preferably, the metal hydride is sodium borohydride, and the sodium borohydride or hydrogen is added to a caustic evaporator which contains a heated caustic solution at a temperature of from 100° C. to about 200° C.

DETAILED DESCRIPTION OF THE INVENTION

The caustic manufacturing system of the present invention includes at least one electrolytic chlor-alkali diaphragm or membrane cell and a caustic evaporation system. The cell functions to electrolytically decompose sodium chloride brine to produce chlorine and a dilute aqueous solution of sodium hydroxide as primary reaction products. In the case of a diaphragm cell, this dilute caustic solution, commonly referred to as "cell liquor", contains approximately 15% to 20% of unconverted sodium chloride brine, 12% to 17% of electrolytically produced sodium hydroxide, and 0.5 grams/liter to 0.6 grams/liter of sodium chlorate as an impurity.

The cell liquor is concentrated in an evaporation system which generally comprises a multiple stage evaporator. Typical of such evaporator systems is the quadruple effect evaporator which is depicted in FIG. 1 of U.S. Pat. No. 4,282,178, issued Aug. 4, 1981, and incorporated by reference herein. The evaporators are maintained at elevated temperatures of up to 200° C. and produce a caustic soda product having a concentration of at least 50% by weight. Steam is supplied to the evaporators as the primary source of heat. The evaporators themselves as well as associated piping to the cells and the caustic cooler, are generally fabricated from nickel nickel alloys or materials such as E-Brite.

The corrosion inhibitor of this invention is hydrogen or a hydrogen-liberating compound. Typical of such hydrogen-liberating compounds are simple binary metal hydrides of general formula $MH_n$, where n is 1 or 2, and M is an alkali or alkaline earth metal such as lithium, sodium, potassium, rubidium, cesium, calcium, strontium or barium, or a covalent hydride such as beryllium hydride, magnesium hydride, aluminum hydride, silane, germane, stannane, arsine, and the like. Transition metal and rare earth hydrides are also within the scope of this invention and include titanium hydride, zirconium hydride, lanthanum dihydride and trihydride and cerium hydride, as are Group VB metal hydrides such as tantalum and niobium hydride, and special binary and ternary hydrogen-storage alloys such as $FeTiH_n$, where n is 1 or 2, $AB_5$ alloys, such as $LaNi_5$, where A is a rare earth metal such as lantanum or thallium, and B is cobalt or nickel, and magnesium titanium alloys such as $Mg_2TiH_6$. Complex metal hydrides of general formula $M(M'H_4)_n$, where n is the valence of M, and M' is a trivalent Group III A metal such as boron, aluminum or gallium, and M is an alkali metal such as lithium, sodium or potassium, are also within the scope of this invention and include lithium borohydride, sodium borohydride, potassium borohydride, lithium aluminum hydride and sodium aluminum hydride. Mixtures of the foregoing can also be used. Of all the metal hydrides listed above, sodium borohydride ($NaBH_4$) is preferred.

The corrosion inhibitor of the present invention can be advantageously added at any stage of the caustic manufacturing process. Thus, the corrosion inhibitor can be added to the cell liquor prior to evaporation or during the evaporation process to any of the evaporator stages. Preferably, the corrosion inhibitor is added to the first evaporator stage for maximum corrosion protection. Alternatively, the corrosion inhibitor can be added to subsequent evaporator stages which are operated at elevated temperatures of from about 100° C. to about 200° C. The metal hydride can also be added directly to the caustic soda product for corrosion protection during storage and shipment.

The metal hydride is preferably added to the caustic manufacturing system in the form of a solution, and preferably as a solution in sodium hydroxide. Increased amounts of metal hydride, in general, provide increased corrosion protection to the system. It has been found advantageous to employ from about 0.1 ppm to about 500 ppm and preferably from about 5 ppm to about 100 ppm for optimal corrosion protection and economy. The use of metal hydrides, such as sodium borohydride, for suppression of caustic corrosion in the present invention represents an attractive alternative to the use of more hazardous materials such as hydrazine since most metal hydrides are comparatively safe to use and can be introduced at any stage in the caustic manufacturing process where nickel corrosion is evident.

Alternatively, hydrogen gas can be supplied to the caustic solution in an amount of from about 0.1 ppm to about 500 ppm, preferably from about 5 ppm to about 100 ppm. One advantage of using hydrogen is that it can be obtained as an electrolytic cell product directly from the electrolytic cell. Thus, the only cost involved is the capital cost of installation.

The following examples are intended to further illustrate various embodiments and features of the invention, and are not intended to limit the scope of the invention. Accordingly, variations and changes may be made by those skilled in the art without departing from the spirit of the claimed invention. Unless otherwise stated, all parts in the examples are parts by weight and all temperatures are in degrees Centigrade.

EXAMPLE 1

A laboratory test was conducted using a rotating nickel cylinder electrode in an aqueous caustic solution containing 50% sodium hydroxide. To simulate the corrosive conditions found in a caustic evaporator, the test was conducted under turbulent conditions at a temperature of about 160° C. Hydrogen gas, sodium borohydride, and hydrazine as a control, were individually supplied to the solution, and the decomposition rate of nickel was measured, both prior to and after the addition of each additive. The results are summarized below.

| Additive | Corrosion Rate of Nickel $(g/m^2 \cdot hr)$ | |
| --- | --- | --- |
| | Without Additive | With Additive |
| $H_2$ Gas (constant addition) | 0.20 to 0.28 | 0.08 |
| $N_2H_4$ (20 ppm to 100 ppm) | 0.20 to 0.28 | 0.02 |
| $NaBH_4$ (5 ppm to 50 ppm) | 0.20 to 0.28 | 0.01 to 0.03 |

EXAMPLE 2

A full-scale plant test was conducted in a caustic evaporation system corresponding generally to FIG. 1 of U.S. Pat. No. 4,282,178. During operation of the system, a 50% solution of caustic soda was produced and analyzed for nickel content. Sodium borohydride was fed to the fourth effect evaporator using a metering pump and a small rotometer to visually verify the flow rate. The actual nickel concentration in the caustic solution decreased from an average of 1.6 ppm prior to addition of sodium borohydride, to an average of 0.6 to 0.3 ppm following the addition of 8 ppm to 14 ppm, respectively, of sodium borohydride.

A 15% bleach prepared from caustic soda after the addition of sodium borohydride to the evaporator was clear and stable in contrast to a bleach prepared from caustic produced without the addition of sodium borohydride.

What is claimed is:

1. A process for suppressing the corrosion of nickel-based components which contact an aqueous caustic solution in the manufacture of caustic soda comprising adding from about 0.1 ppm to about 500 ppm of metal hydride to said aqueous caustic solution during the caustic manufacturing process.

2. The process of claim 1 wherein the metal hydride is selected from the group consisting of alkali metal hydrides, alkaline earth metal hydrides, lithium borohydride, sodium borohydride, potassium borohydride, lithium aluminum hydride and sodium aluminum hydride.

3. The process of claim 2 wherein the metal hydride is sodium borohydride.

4. The process of claim 3 wherein the sodium borohydride is added in an amount of from about 5 ppm to about 100 ppm.

5. The process of claim 3 wherein the nickel-based components are caustic evaporator surfaces.

6. The process of claim 5 wherein the caustic evaporator is a multiple stage evaporator.

7. The process of claim 6 wherein the sodium borohydride is added to the first evaporator stage.

8. The process of claim 6 wherein the evaporators are operated at a temperature of from about 100° C. to about 200° C.

9. An aqueous caustic solution comprising from about 10% to about 80% by weight of sodium hydroxide, sodium chlorate as an impurity, and from about 0.1 ppm to about 500 ppm of a metal hydride.

10. The solution of claim 9 wherein the metal hydride is selected from the group consisting of alkali metal hydrides, alkaline earth metal hydrides, lithium borohydride, sodium borohydride, potassium borohydride, lithium aluminum hydride and sodium aluminum hydride.

11. The solution of claim 10 wherein the metal hydride is sodium borohydride.

12. The solution of claim 11 wherein the sodium hydroxide is present in an amount of from about 40% to about 80% by weight.

13. The solution of claim 12 wherein the sodium chlorate is present in an amount of from about 0.02% to about 1% by weight.

14. The solution of claim 13 wherein the sodium borohydride is present in an amount of from about 5 ppm to about 100 ppm.

* * * * *